(12) United States Patent
Caveney

(10) Patent No.: US 6,896,547 B2
(45) Date of Patent: May 24, 2005

(54) MULTIMEDIA OUTLET BOX

(75) Inventor: Jack E. Caveney, Hinsdale, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 10/215,583

(22) Filed: Aug. 9, 2002

(65) Prior Publication Data

US 2004/0029437 A1 Feb. 12, 2004

(51) Int. Cl.$^7$ .......................... H01R 13/60; H01R 13/66
(52) U.S. Cl. ..................... 439/535; 439/536; 439/100
(58) Field of Search .................. 439/100, 527, 439/535–536; 385/135

(56) References Cited

U.S. PATENT DOCUMENTS

| | | | |
|---|---|---|---|
| 2,369,570 A | 2/1945 | Jalbert | |
| 2,528,989 A | 11/1950 | Ammells | |
| 4,303,296 A | 12/1981 | Spaulding | |
| 4,627,684 A | * 12/1986 | D'Amato | 439/892 |
| 4,775,802 A | 10/1988 | Dods | 307/147 |
| 5,143,868 A | 9/1992 | Caveney et al. | 439/535 |
| 5,211,583 A | 5/1993 | Endo et al. | 439/595 |
| 5,236,371 A | 8/1993 | Matthis | 439/501 |
| 5,295,869 A | 3/1994 | Siemon et al. | 439/620 |
| 5,362,254 A | 11/1994 | Siemon et al. | 439/536 |
| 5,676,566 A | 10/1997 | Carlson, Jr. et al. | 439/638 |
| 5,804,765 A | 9/1998 | Siemon et al. | 174/65 R |
| 5,947,765 A | 9/1999 | Carlson, Jr. et al. | 439/535 |
| 5,984,728 A | * 11/1999 | Chen et al. | 439/620 |
| 6,200,159 B1 | * 3/2001 | Chou | 439/535 |
| 6,315,598 B1 | 11/2001 | Elliot et al. | 439/456 |
| 6,350,151 B1 | 2/2002 | Elliot et al. | 439/535 |
| 6,522,548 B1 | * 2/2003 | Duggan et al. | 361/728 |
| 6,642,450 B1 | * 11/2003 | Hsiao | 174/53 |
| 2004/0110415 A1 | * 6/2004 | Huang | 439/535 |

* cited by examiner

Primary Examiner—Michael C. Zarroli
(74) Attorney, Agent, or Firm—Robert A. McCann; Christopher S. Clancy

(57) ABSTRACT

An outlet box is disclosed. The outlet box has a base including a rear surface of the outlet box, and a cover including a front surface of the outlet box. The cover is configured to engagingly fit over the base. An intermediate portion extends from one or both of the base and cover and extends generally between the rear surface and the front surface. The cover, the base, and the intermediate portion cooperatively define an interior of the outlet box when the cover and the base are engagingly fitted together. The intermediate portion includes a pair of opposed inwardly inclined portions and a pair of set-off portions extending from the inner more ends of the inwardly inclined portions, and at least one of the inclined portions includes an aperture therein. A connector is disposed within the base, and the connector has an opening for receiving a plug.

22 Claims, 6 Drawing Sheets

MULTIMEDIA OUTLET BOX

BACKGROUND OF THE INVENTION

The present invention relates generally to telecommunications and multimedia junctions, and particularly to outlet boxes for facilitating telecommunications and multimedia-type junctions and connections within a work space or other place where space is at a premium.

Outlet boxes designed for the work place need to account for potentially tight space considerations. In particular, providing access to the connectors housed therein from a variety of angles is often advantageous, as seen for example in U.S. Pat. No. 5,947,765. This is especially true of outlet boxes intended to be wall-mounted or otherwise disposed within a visible and usable work space, as opposed to when outlet boxes are mounted in more discreet locations, such as when they are underfloor-mounted or when they reside above a false ceiling. The space limitations associated with a work space might, for example, yield situations where a particular cable only has sufficient length to reach one particular side of an outlet box and/or from one particular angle. Also, fiberoptic cabling generally must avoid sharp turns or bends, and often has a "minimum bend radius" associated with particular cable. Standard outlet boxes having traditional configurations sometimes fail to accommodate the demands of fiberoptic cabling by requiring sharp turns of the cabling in order to plug into particular connectors or by having sharp corners on the perimeter of the box.

Many different types of outlet boxes exist, but a significant shortcoming of many prior art designs is that they do not support a large number of "gravity-feed" connections, connections where a cable approaches the outlet box at an upward angle or direction such that gravity's effect on the cable is more minimal, especially with regard to adversely affecting the bend radius near the outlet box. Sometimes even connectors that provide "gravity-feed" connections, such as the ones shown in U.S. Pat. No. 5,947,765, fail to provide sufficient clearance for the cables entering the "gravity-feed" connectors to avoid bend radius problems due to the potential proximity of other office equipment and the like.

Other outlet boxes fail to provide for easy access to the interior thereof, such as to access cable or switch particular connectors into and out of particular bays of the outlet box. This can limit the adaptability of the outlet box for particular telecommunications or multimedia applications. Still other outlet boxes fail to provide cable slack management features, such as bend radii, inside the boxes. Such failure may encourage deleterious cable kinking and tangling within the boxes. Some boxes may also have connectors oriented to make plugs difficult to insert into or remove from the connectors, especially when adjacent connectors have plugs inserted therein. Still other boxes may require a fiberoptic cable to be twisted to enable a plug to be inserted into its connectors. Twisting of fiberoptic cables, especially when coupled with other stresses, may have detrimental effects on the signals being passed through them. Thus, there is a need for an improved multimedia outlet box.

SUMMARY OF THE INVENTION

Disclosed and claimed herein is an outlet box for addressing the above-identified shortcomings of prior devices.

In an embodiment of the invention, there is provided an outlet box having a base including a rear surface of the outlet box, a cover including a front surface of the outlet box, the cover being configured for engagingly fitting over the base, an intermediate portion extending from one or both of the base and cover and extending generally between the rear surface and the front surface, whereby the cover, the base, and the intermediate portion cooperatively define an interior of the outlet box when the cover and the base are engagingly fitted together, the intermediate portion including a pair of opposed inwardly inclined portions and a pair of set-off portions extending from the inner more ends of the inwardly inclined portions, at least one of the inclined portions including an aperture therein, and a connector disposed within the base, the connector having an opening for receiving a plug.

In another embodiment of the invention, there is provided an outlet box having a base including a rear surface of the outlet box, a cover including a front surface of the outlet box, the cover being configured for engagingly fitting over the base, an intermediate portion extending from one or both of the base and cover and extending generally between the rear surface and the front surface, whereby the cover, the base, and the intermediate portion cooperatively define an interior of the outlet box when the cover and the base are engagingly fitted together, the intermediate portion including a pair of opposed inwardly inclined portions, at least one of the inclined portions including an aperture therein, and a connector disposed within the base, the connector having an opening configured for receiving a latched plug, the opening being oriented such that when the latched plug is disposed within the connector, the latch extends toward the front surface of the outlet box.

DESCRIPTION OF PREFERRED EMBODIMENTS

Figure 1:
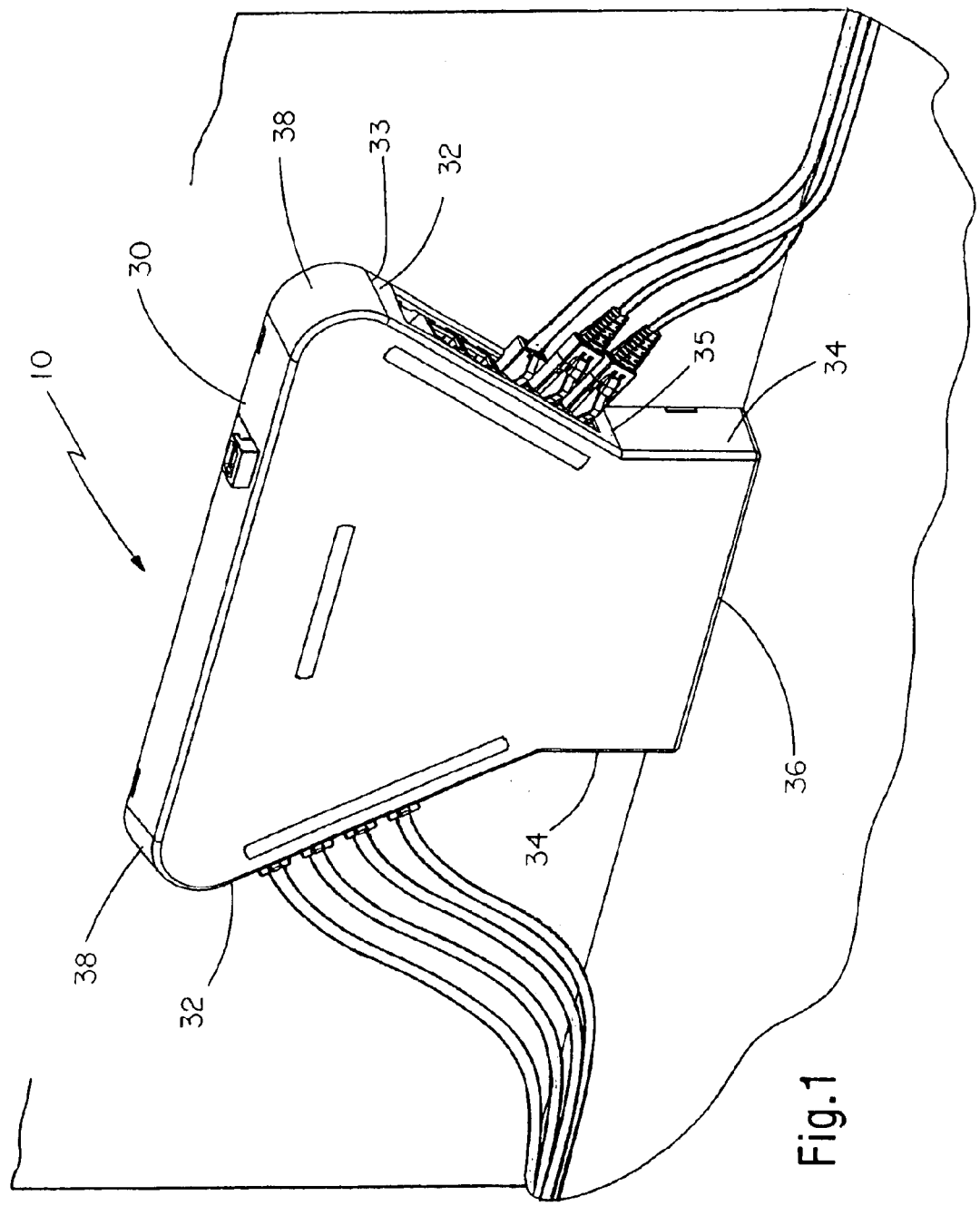
FIG. 1 is a perspective view of an assembled outlet box in accordance with an embodiment of the invention.

A modern office communication network can include a variety of voice, data, and video cables which connect, for example, central office telephone equipment to individual telephones and main frame computers to remote personal computers. The terminal ends of these cables are provided with appropriate connectors for selective interconnection to remote equipment. The present invention provides a means to securely mount a variety of these connectors, possibly from different media, in one enclosure for subsequent connection to cables connected to various office equipment.

In accordance with an embodiment of the invention, there is provided a 12-port outlet box 10, as shown in FIGS. 1–4. The outlet box 10 is shown in assembled form in FIG. 1 and disassembled form in FIG. 2. As seen in these figures, the box 10 includes a cover 12 that snappingly engages with, and is disengageable from, a base 14. The cover includes the front surface 16 of the box and a generally perpendicular side wall 18 that contributes to the intermediate portion of the box when the cover and base are mutually engaged. The base includes the rear surface 20 of the box and a generally perpendicular side wall 22 upstanding therefrom that, like the side wall 18 of the cover, contributes to the intermediate portion of the box when the cover and base are mutually engaged.

Figure 3:
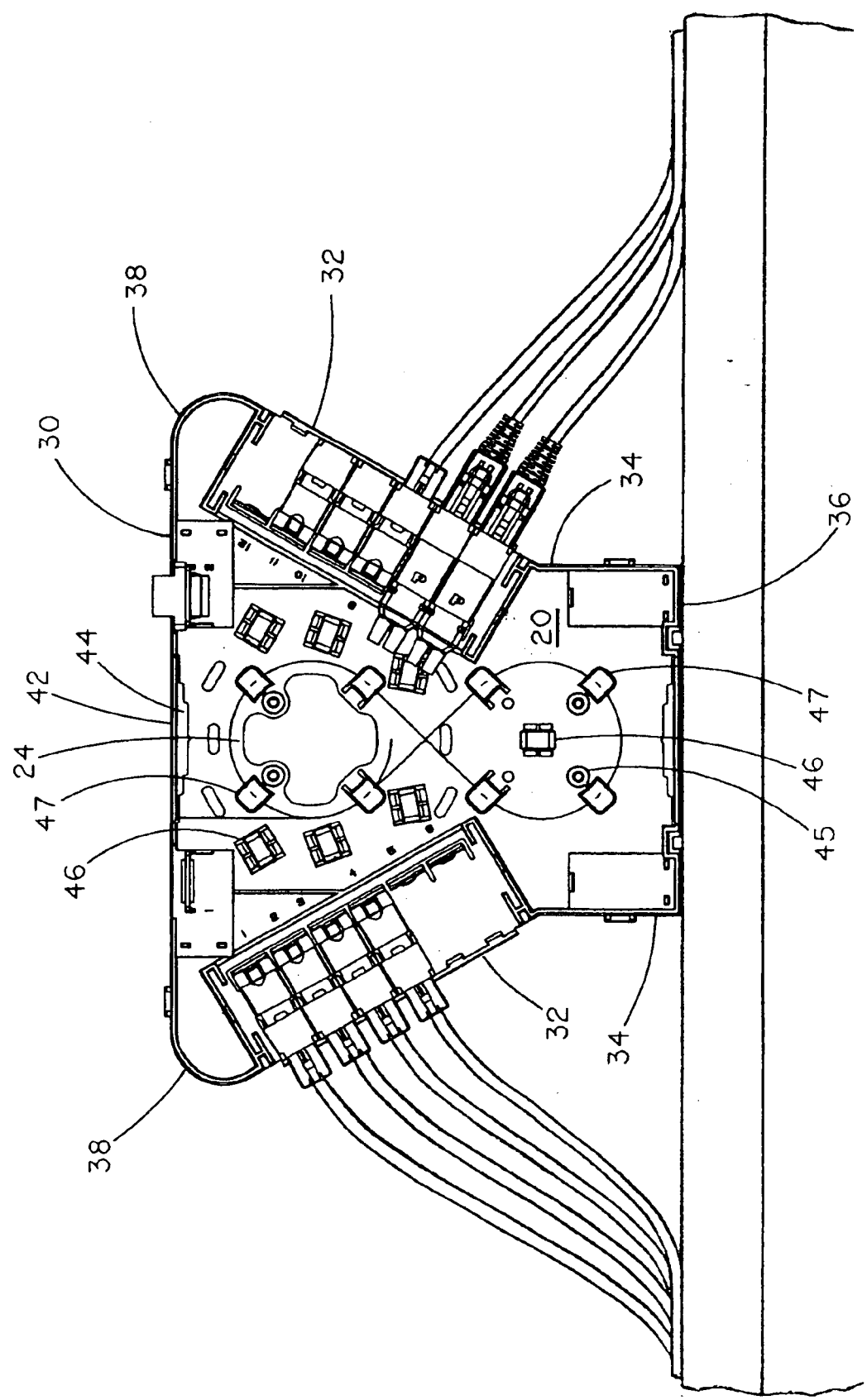
FIG. 3 is a top plan view of the base portion of the outlet box of FIG. 1.
Figure 4:
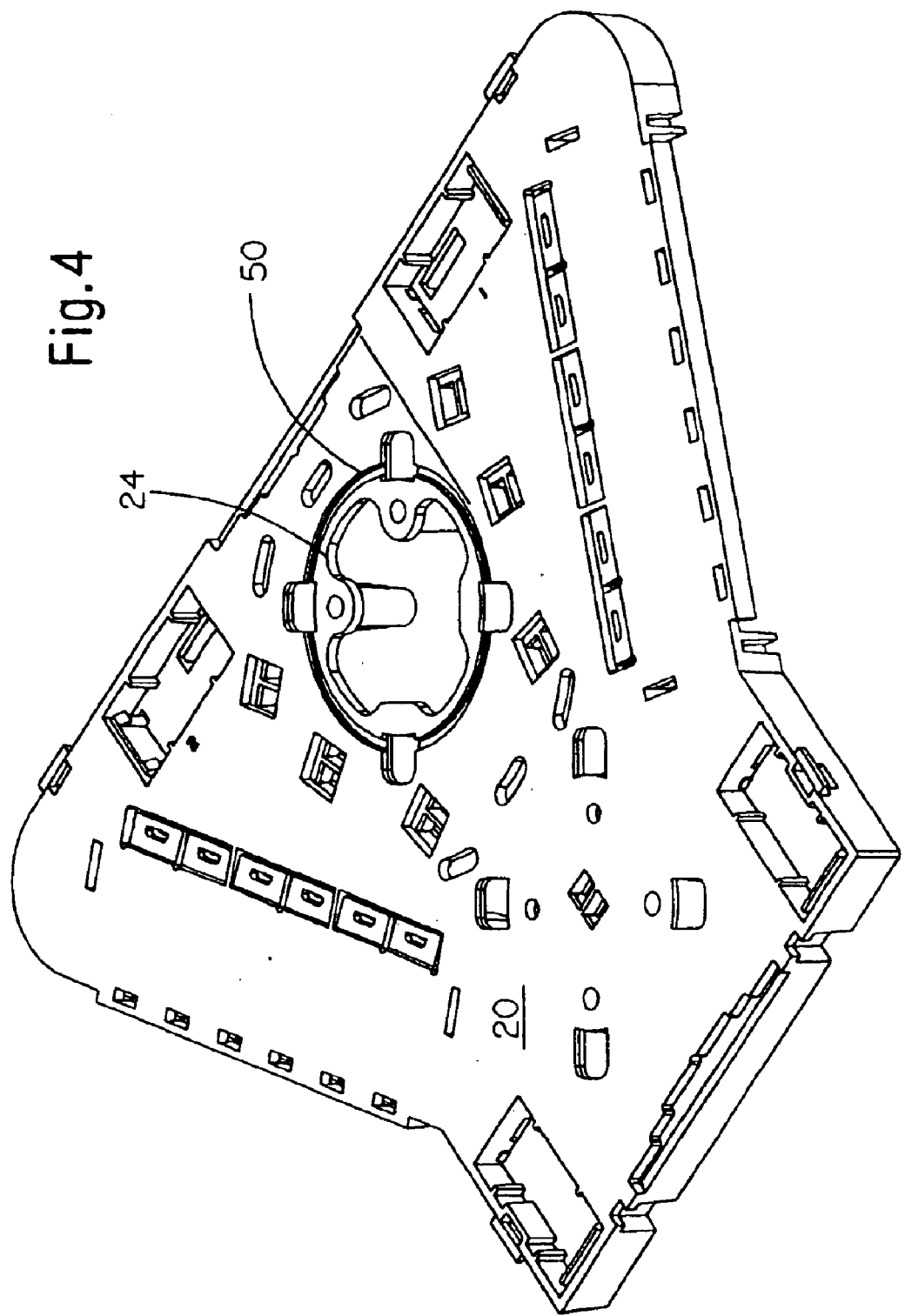
FIG. 4 is a perspective view of the underside of the base portion of the outlet box of FIG. 1.

As best seen from the plan view of FIG. 3, the base and whole box have a distinctive geometry, including a top portion 30, a pair of inwardly inclined portions 32 extending inwardly from the outer more ends 33 of the top portion, a pair of set-off portions 34 extending from the inner more ends 35 of the inclined portions, and a bottom portion 36 extending from and between the opposite ends of the set-off portions.

In a preferred embodiment of the invention, the set-off portions 34 are generally perpendicular to the top portion 30, while the bottom portion 36 is generally parallel to the top portion 30, though these relationships need not exist within the context of the invention.

In a preferred embodiment of the invention, the outer more ends 33 of the inwardly inclined portions 32 and the top portion 30 meet at rounded corners 38. Such rounded corners provide bend radius control for fiberoptic cables if they are wrapped around that portion of the box. Sharper corners might cause damage to fiberoptic or other more fragile cables that might inhibit signal transmission thereover.

In a preferred embodiment of the invention, the inclined portions 32 are at an angle of about 45 degrees relative to the top portion 30, and/or relative to a vertical orientation, but this angle may vary significantly.

Figure 2:
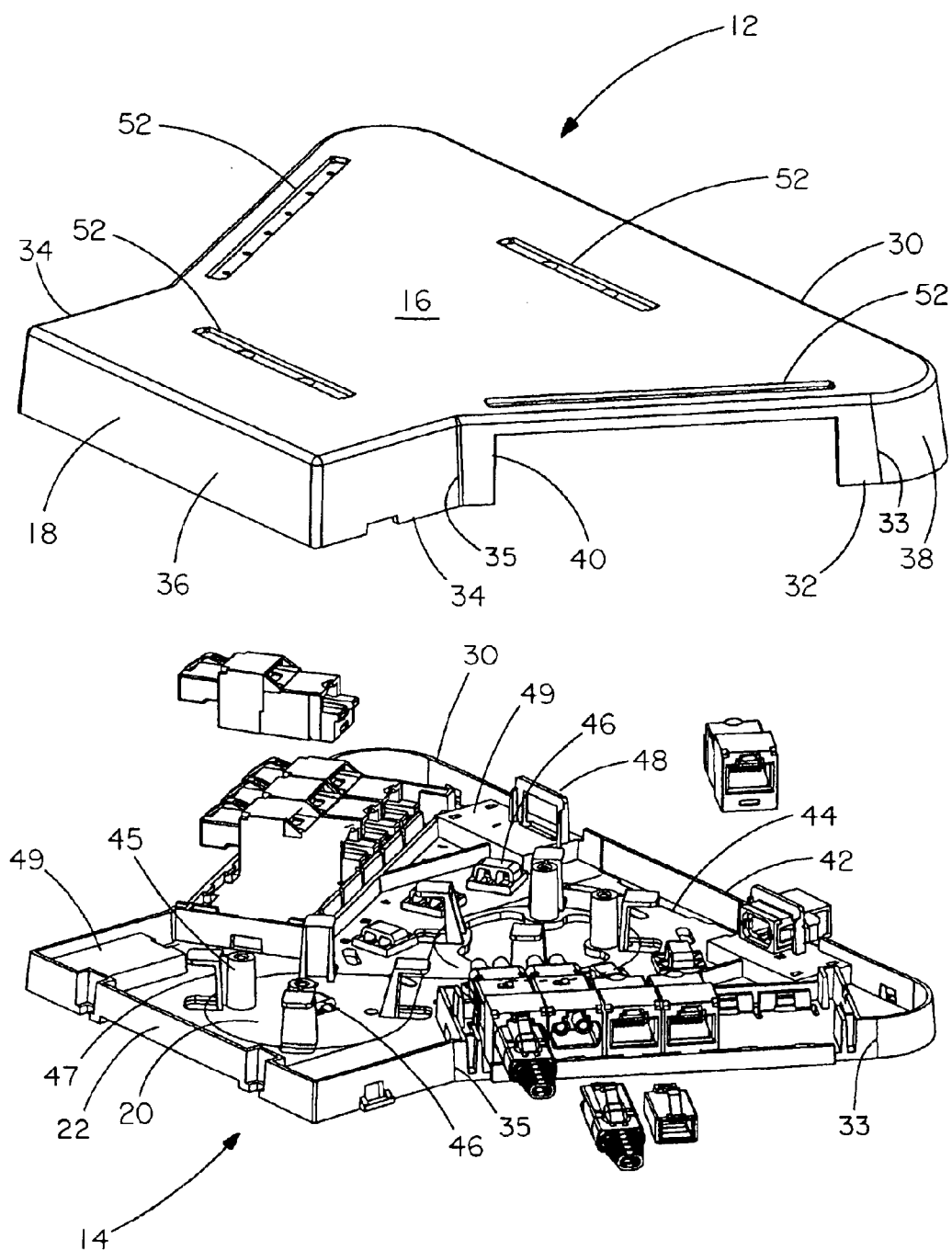
FIG. 2 is an exploded disassembled perspective view of the outlet box of FIG. 1.

As seen in FIGS. 2 and 3, the base 14 includes bays for permitting the insertion into the box of various jack/connector configurations. For example, up to twelve single-position jacks may be accommodated along the interior side of the inwardly inclined portions, six on each side. Alternatively, banks of jacks may be used, such as a single bank of six adjacent jacks or two adjacent banks of three jacks along each inwardly inclined portion. The connectors/jacks may or may not be of identical type, as any combination can be used in the multimedia box. FIG. 2, for example, shows fiberoptic connectors and standard telephone jacks in side-by-side configuration.

In a preferred embodiment of the invention, the base includes an inlet hole 24 generally in the center thereof for permitting cable to enter the interior of the box there through. In a preferred embodiment, the shape of the hole allows for the cables to flow to the connector positions more easily, and thereby deters unwanted slack within the interior of the box and unnecessary redirections that may increase the chances of damage to fibers or signal degradation.

In a preferred embodiment of the invention, break-out portions 42 are found along the intermediate portion of the box to function as alternate inlets or outlets for cables, especially via means such as raceway. FIG. 2 shows such a break-out in the top portion 30 of the box. Notches 44 may be used to facilitate the break-outs.

In a preferred embodiment of the invention, the base includes mounting holes or bosses 45 that are compatible with NEMA standard single gang and double gang boxes.

In a preferred embodiment of the invention, the base includes spooling structures to facilitate cable slack storage. In the shown embodiment, some of the spooling structures 47 are attached to the bosses 45. In the shown embodiment, the spooling pattern is generally a figure-8. The figure-8 pattern allows for the fiber slack to be spread out over a larger area, thereby avoiding a large bundle of fibers residing about a single diameter.

In a preferred embodiment of the invention, the base includes one or more cable tie down structures 46 to facilitate the bundling, management, and/or routing of cables within the interior of the box.

In a preferred embodiment of the invention, the base includes one or more breakouts 48 for an MPO adapter to be inserted.

In a preferred embodiment of the invention, the base includes one or more magnet pockets 49 for retaining magnets as an alternate method for mounting the box on a surface. The box could alternatively or additionally be supplied with double-sided adhesive foam tape for mounting.

In a preferred embodiment of the invention, the base includes labeling areas 52 for identifying the corresponding ports. Such areas 52 may also act as screw covers, hiding screws that secure the cover to the base.

In the shown embodiment, the base contains four notches to permit the cover to snappingly engage the base. At the notches are screwdriver release pads to facilitate removing the cover from the base.

As can be seen from the figures, when the shown embodiment is installed in the orientation shown in FIGS. 1 and 3 upon a wall or other vertical surface, the inwardly inclined portions of the box facilitate "gravity-feed" connections in that the plugs approach the connectors at an upward angle. Thus, the cables extending from the plugs do not encounter the same degree of kinking near the plug due to the weight of the cables themselves, as opposed to cables approaching horizontally, downwardly, or at a downward angle. Rather, the more upwardly the approach, the less kinking that is caused.

Importantly, as best seen in FIGS. 1 and 3, the rectangular section of the box, generally defined by set-off portions 34 and bottom portion 36, sets the box off from any furniture or other obstructions that may be located just below the box along its vertical mounting surface. Without such a set-off, cables approaching the box at an upward angle would likely encounter kinking issues against the furniture since the cable would have very little distance in which to turn a significant angle.

Thus, the shown embodiment of the invention includes a trapezoidal section defined primarily by the inclined portions 32 and the top portion 30 residing just above a rectangular (or other quadrilateral) section defined by the set-off portions 34 and the bottom portion 36. The rectangular section provides set-off and thereby helps prevent breaking the minimum bend radius for optical cables. Additionally, the section providing set-off also prevents the potential problem of difficulty or impossibility of inserting plugs into gravity-feed connectors wherein insufficient space is provided between the connectors and office obstructions, such as desks, cabinets, book cases, computer monitors, wall outlets, thermostats, and the like. Thus, such obstructions can cause damage to optical cable or make difficult or impossible the insertion of plugs when no set-off section is provided.

The rectangular set-off section of the shown embodiment need not actually be rectangular and the set-off portions need not actually be straight or mutually parallel, as any similar set-off structure could perform similar functions, and such similar structure is considered to be alternative within the context of the invention.

Figure 5:
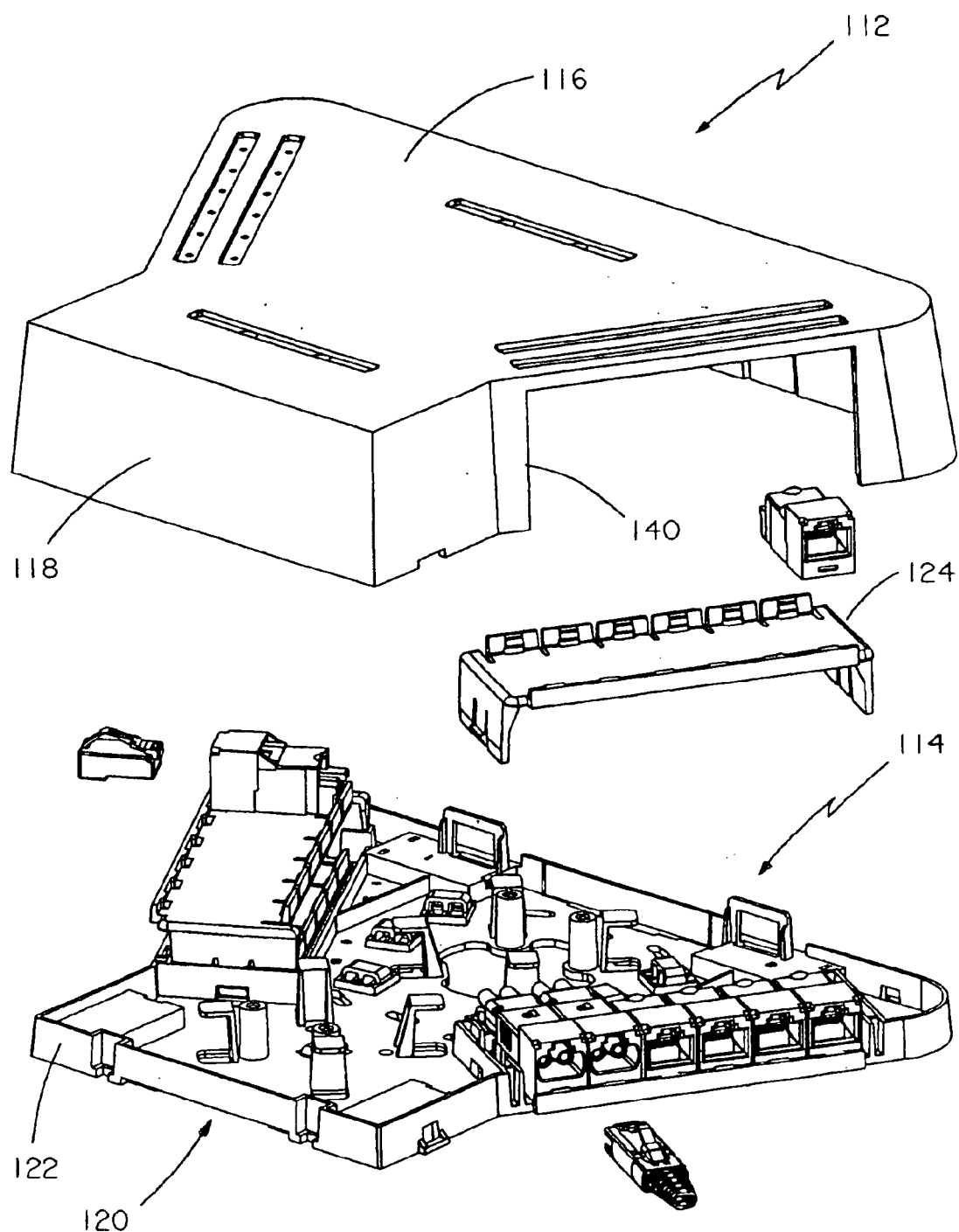
FIG. 5 is an exploded disassembled perspective view of an outlet box in accordance with an alternate embodiment of the invention.
Figure 6:
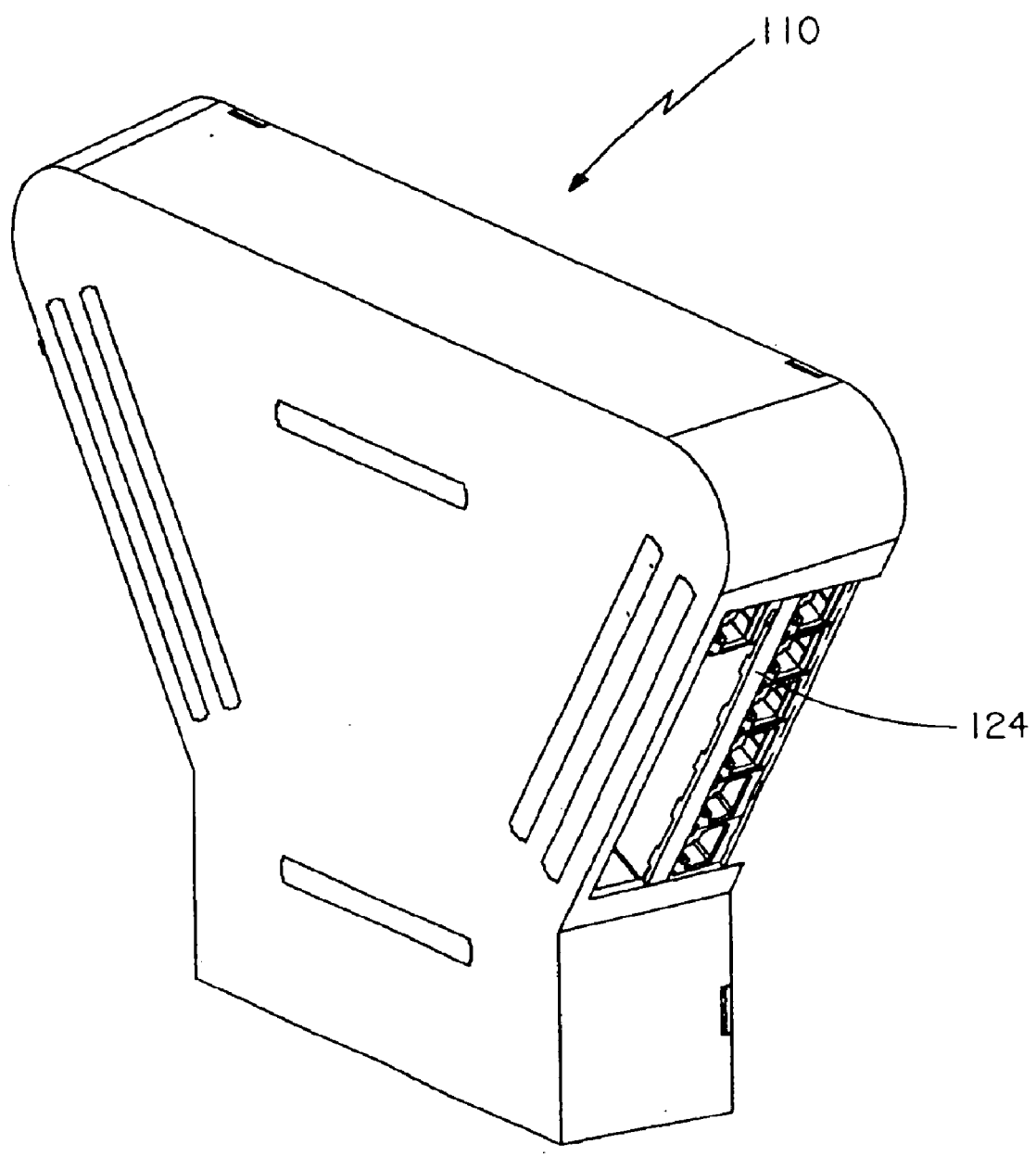
FIG. 6 is a perspective view of the outlet box of FIG. 5 wherein the outlet box is assembled.

In accordance with an alternate embodiment of the invention, there is provided a 24-port outlet box, as shown in FIGS. 5–6. The outlet box 110 is shown in assembled form in FIG. 6 and disassembled form in FIG. 5. As seen in these figures, the box 110 includes a cover 112 that snappingly engages with, and is disengageable from, a base 114. The cover includes the front surface 116 of the box and a generally perpendicular side wall 118 that contributes to the intermediate portion of the box when the cover and base are mutually engaged. The base includes the rear surface 120 of the box and a generally perpendicular side wall 122 upstanding therefrom that, like the side wall 118 of the cover, contributes to the intermediate portion of the box when the cover and base are mutually engaged.

Preferably, base 14 of the 12-port embodiment and base 114 of the 24-port embodiment are identical, and either cover 12 or cover 112 may be used with the common base, depending on whether the 12-port or 24-port embodiment of the outlet box is needed for a particular application.

In the shown 24-port embodiment, a bridge 124 is snapped into or otherwise engaged with structure of the base 114 to expand the capacity of the box from 12 ports to 24 ports. To provide space for the additional row of connectors, the cover 112 is deeper than its 12-port cover counterpart. The cut-away portion 140 of the cover side wall 118 is also correspondingly larger than its 12-port cut-away portion counterpart to accommodate the bridge and multiple rows of connectors. The 24-port embodiment simply permits more like-sized connectors to be housed within the outlet box, while providing the same flexibility relating to different types, configurations, and orientations of connectors and corresponding plugs. As seen in FIG. 6, for example, fiberoptic connectors can adjoin telephone jacks in various combinations.

In both shown embodiments, at least some of the connectors have openings configured for receiving a latched plug, the openings being oriented such that when corresponding latched plugs are disposed within the connectors, the latches extend toward the front surface of the outlet box. This orientation has the benefit that when various plugs are located within adjacent connectors, it is easier to activate the latch to permit disengagement of one of the plugs when the latch is not located between the adjacent plugs, as it would be if the connectors and plugs were rotated 90 degrees in either direction. Additionally, such an orientation of the connectors may require less twisting of fiberoptic cables resulting from mating with the connectors. The decreased twisting decreases the risk of damaging the fiberoptic cables from an overstressed condition.

The disclosed invention provides an improved multimedia outlet box. It should be noted that the above-described and illustrated embodiments of the invention are not an exhaustive listing of the forms an outlet box in accordance with the invention could take; rather, they serve as exemplary and illustrative of preferred embodiments of the invention as presently understood. Many other forms of the invention are believe to exist. Examples inexhaustively include boxes wherein the inclined portions form angles other than 45 degrees relative to other portions of the box and/or to a vertical orientation, boxes wherein the set-off portions are not mutually parallel or parallel or perpendicular to any particular portions of the box or a vertical orientation, boxes wherein the top portion includes multiple segments not necessarily coplanar or collinear with each other, and boxes wherein the number of connectors housed is greater or lesser than 12 or 24, or the number of rows of connectors is greater than two.

The invention is defined by the following claims.
What is claimed is:
1. An outlet box comprising:
   a base including a rear surface of said outlet box;
   a cover including a front surface of said outlet box, said cover being configured for engagingly fitting over said base;
   an intermediate portion extending from one or both of said base and cover and extending generally between said rear surface and said front surface, whereby said cover, said base, and said intermediate portion cooperatively define an interior of said outlet box when said cover and said base are engagingly fitted together;
   said intermediate portion including a pair of opposed inwardly inclined portions and a pair of set-off portions extending from the inner more ends of said inwardly inclined portions, at least one of said inclined portions including an aperture therein;
   a connector disposed within said base, said connector having an opening for receiving a plug; and
   a generally trapezoidal section defined in part by said pair of opposed inwardly inclined portions and a generally rectangular section extending from the shorter parallel side of said trapezoidal section.

2. An outlet box in accordance with claim 1 wherein said cover is configured for removably fitting over said base.

3. An outlet box in accordance with claim 1 wherein each of said inclined portions forms an exterior angle of approximately 135 degrees with the corresponding set-off portion extending therefrom.

4. An outlet box in accordance with claim 1 including a top portion generally connecting said pair of opposed inwardly inclined portions proximate the outer more ends of said inwardly inclined portions.

5. An outlet box in accordance with claim 4 wherein said top portion connects with at least one of said inwardly inclined portions at a rounded corner.

6. An outlet box in accordance with claim 4 wherein said top portion includes a break-out hole for permitting entry of said plug into said interior of said outlet box.

7. An outlet box in accordance with claim 1 further including structure within said interior thereof for providing slack storage of fiberoptic cable located therein.

8. An outlet box in accordance with claim 1 further including at least two rows of connectors disposed therein.

9. An outlet box in accordance with claim 1 wherein said rear surface includes an inlet hole for permitting entry of a cable into said interior of said outlet box to connect with said connector, wherein said inlet hole is shaped to guide said cable toward said connector.

10. An outlet box comprising:
    a base including a rear surface of said outlet box;
    a cover including a front surface of said outlet box, said cover being configured for engagingly fitting over said base;
    an intermediate portion extending from one or both of said base and cover and extending generally between said rear surface and said front surface, whereby said cover, said base, and said intermediate portion cooperatively define an interior of said outlet box when said cover and said base are engagingly fitted together;
    said intermediate portion including a pair of opposed inwardly inclined portions, at least one of said inclined portions including an aperture therein;
    a connector disposed within said base, said connector having an opening configured for receiving a latched plug, said opening being oriented such that when said latched plug is disposed within said connector, the latch extends toward said front surface of said outlet box; and a generally trapezoidal section defined in part by said pair of opposed inwardly inclined portions and a generally rectangular section extending from the shorter parallel side of said trapezoidal section.

11. An outlet box in accordance with claim 10 wherein said cover is configured for removably fitting over said base.

12. An outlet box in accordance with claim 10 wherein each of said inclined portions forms an exterior angle of approximately 135 degrees with a corresponding set-off portion extending therefrom.

13. An outlet box in accordance with claim 10 including a top portion generally connecting said pair of opposed inwardly inclined portions proximate the outer more ends of said inwardly inclined portions.

14. An outlet box in accordance with claim 13 wherein said top portion connects with at least one of said inwardly inclined portions at a rounded corner.

15. An outlet box in accordance with claim 13 wherein said top portion includes a break-out hole for permitting entry of said plug into said interior of said outlet box.

16. An outlet box in accordance with claim 10 further including structure within said interior thereof for providing slack storage of fiberoptic cable located therein.

17. An outlet box in accordance with claim 10 further including at least two rows of connectors disposed therein.

18. An outlet box in accordance with claim 10 wherein said rear surface includes an inlet hole for permitting entry of a cable into said interior of said outlet box to connect with said connector, wherein said inlet hole is shaped to guide said cable toward said connector.

19. An outlet box comprising:

a base including a rear surface of said outlet box;

a cover including a front surface of said outlet box, said cover being configured for engagingly fitting over said base;

an intermediate portion extending from one or both of said base and cover and extending generally between said rear surface and said front surface, whereby said cover, said base, and said intermediate portion cooperatively define an interior of said outlet box when said cover and said base are engagingly fitted together;

said intermediate portion including a pair of opposed inwardly inclined portions and a pair of set-off portions extending from the inner more ends of said inwardly inclined portions, at least one of said inclined portions including an aperture therein;

a connector disposed within said base, said connector having an opening for receiving a plug; and a top portion generally connecting said pair of opposed inwardly inclined portions proximate the outer more ends of said inwardly inclined portions at a rounded corner.

20. An outlet box comprising:

a base including a rear surface of said outlet box;

a cover including a front surface of said outlet box, said cover being configured for engagingly fitting over said base;

an intermediate portion extending from one or both of said base and cover and extending generally between said rear surface and said front surface, whereby said cover, said base, and said intermediate portion cooperatively define an interior of said outlet box when said cover and said base are engagingly fitted together;

said intermediate portion including a pair of opposed inwardly inclined portions and a pair of set-off portions extending from the inner more ends of said inwardly inclined portions, at least one of said inclined portions including an aperture therein;

a connector disposed within said base, said connector having an opening for receiving a plug; and a top portion generally connecting said pair of opposed inwardly inclined portions proximate the outer more ends of said inwardly inclined portion, said top portion includes a break-out hole for permitting entry of said plug into said interior of said outlet box.

21. An outlet box comprising:

a base including a rear surface of said outlet box:

a cover including a front surface of said outlet box, said cover being configured for engagingly fitting over said base;

an intermediate portion extending from one or both of said base and cover and extending generally between said rear surface and said front surface, whereby said cover, said base, and said intermediate portion cooperatively define an interior of said outlet box when said cover and said base are engagingly fitted together;

said intermediate portion including a pair of opposed inwardly inclined portions, at least one of said inclined portions including an aperture therein;

a connector disposed within said base, said connector having an opening configured for receiving a latched plug, said opening being oriented such that when said latched plug is disposed within said connector, the latch extends toward said front surface of said outlet box; and a top portion generally connecting said pair of opposed inwardly inclined portions proximate the outer more ends of said inwardly inclined portions at a rounded corner.

22. An outlet box comprising:

a base including a rear surface of said outlet box;

a cover including a front surface of said outlet box, said cover being configured for engagingly fitting over said base;

an intermediate portion extending from one or both of said base and cover and extending generally between said rear surface and said front surface, whereby said cover, said base, and said intermediate portion cooperatively define an interior of said outlet box when said cover and said base are engagingly fitted together;

said intermediate portion including a pair of opposed inwardly inclined portions, at least one of said inclined portions including an aperture therein;

a connector disposed within said base, said connector having an opening configured for receiving a latched plug, said opening being oriented such that when said latched plug is disposed within said connector, the latch extends toward said front surface of said outlet box; and a top portion generally connecting said pair of opposed inwardly inclined portions proximate the outer more ends of said inwardly inclined portions, said top portion includes a break-out hole for permitting entry of said plug into said interior of said outlet box.

* * * * *